Sept. 27, 1960 E. W. ANDERSON 2,953,812
CONTINUOUS VACUUMIZING STUFFER
Filed July 2, 1956 4 Sheets-Sheet 1

Inventor:
Eric W. Anderson
By Kent W. Wonnell
Atty.

Sept. 27, 1960 E. W. ANDERSON 2,953,812
CONTINUOUS VACUUMIZING STUFFER
Filed July 2, 1956 4 Sheets-Sheet 2

Inventor:
Eric W. Anderson
By Kurt W. Wonnell Atty.

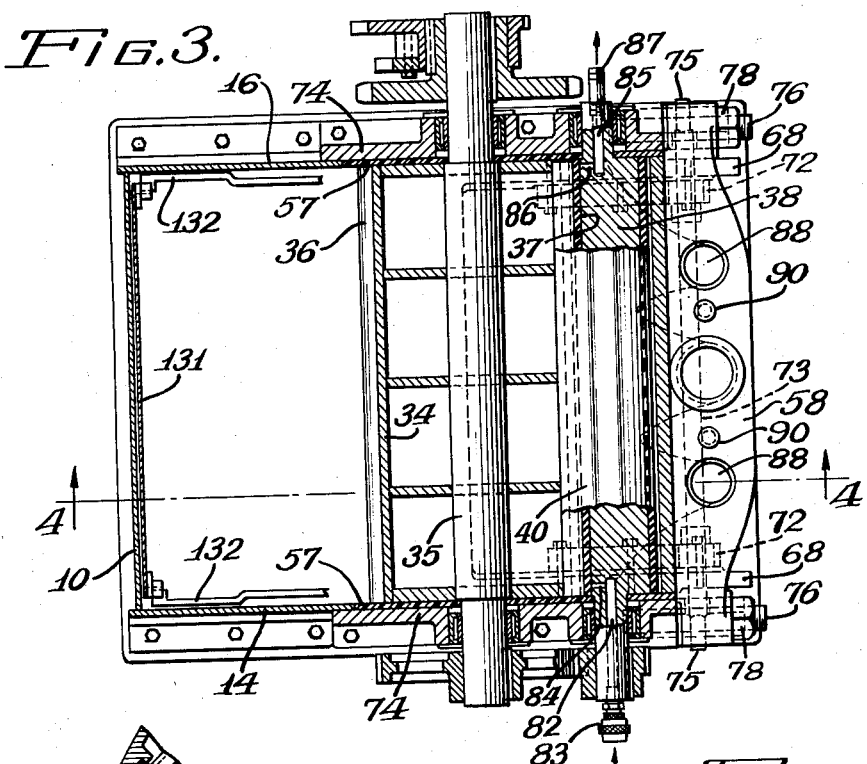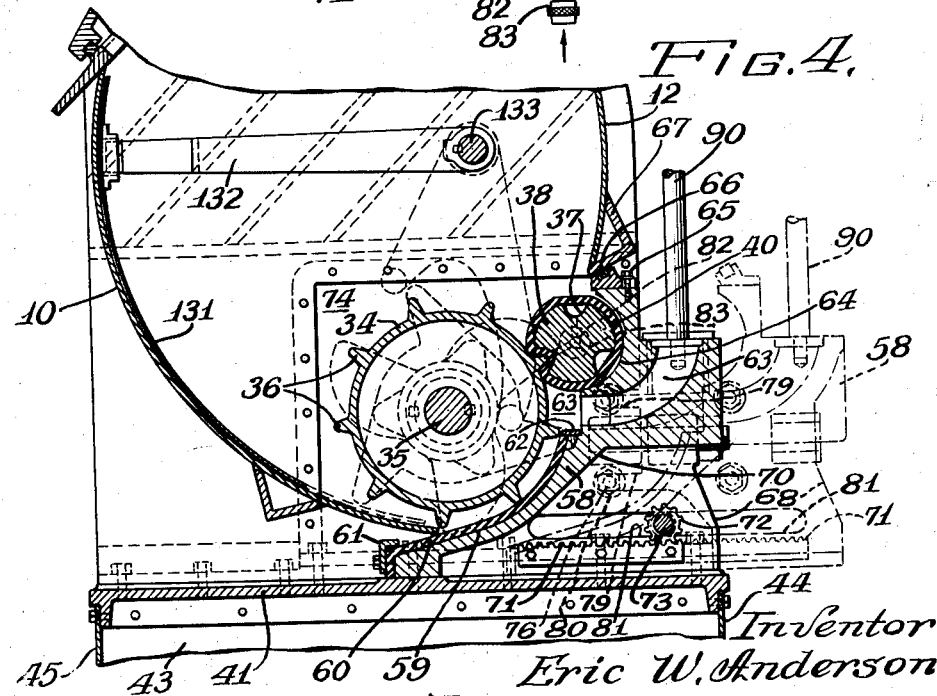

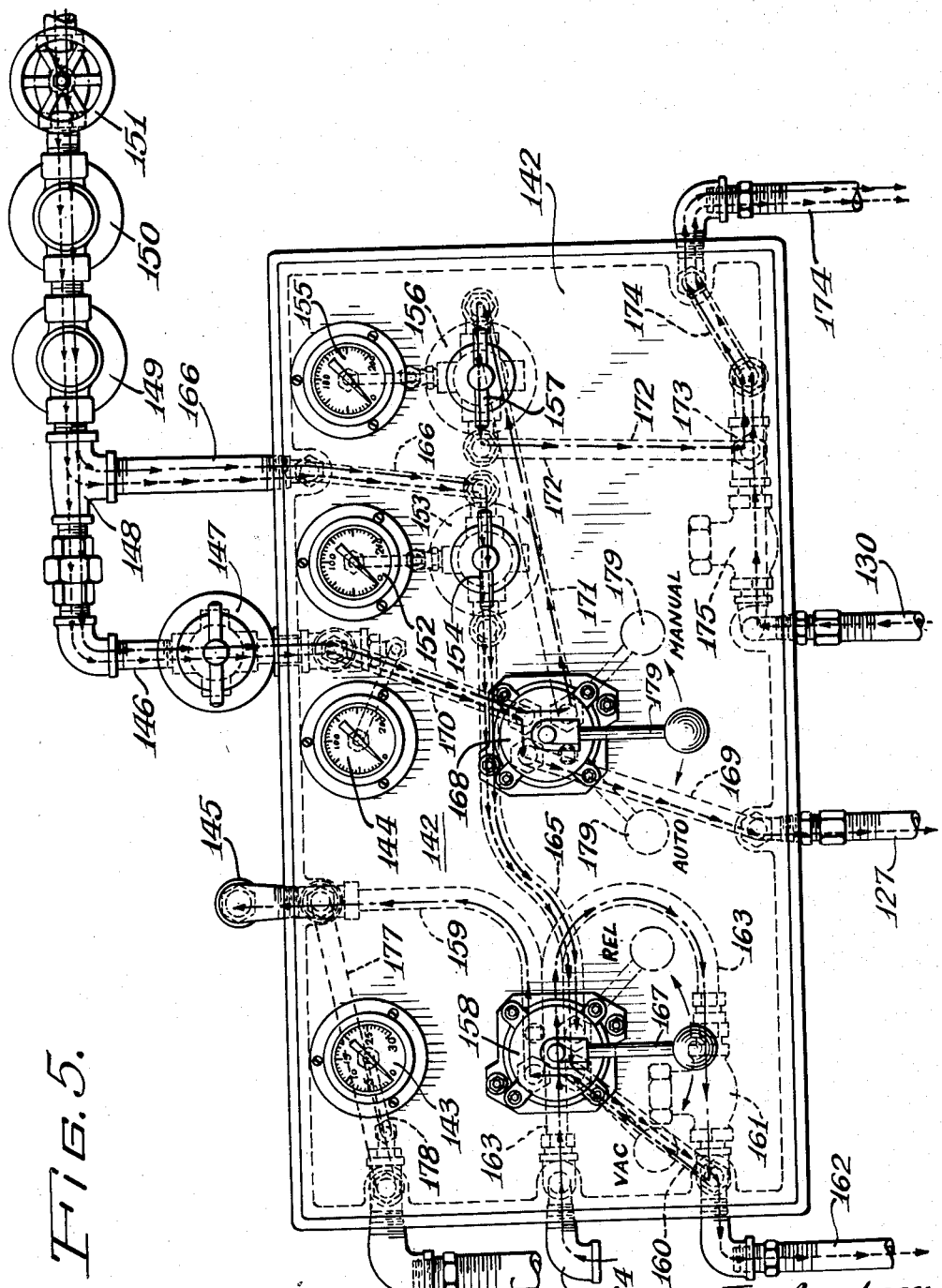

# United States Patent Office 2,953,812
Patented Sept. 27, 1960

2,953,812
CONTINUOUS VACUUMIZING STUFFER

Eric W. Anderson, Chicago, Ill., assignor to Dohm & Nelke, Inc., St. Louis, Mo., a corporation of Missouri Filed July 2, 1956, Ser. No. 595,146

13 Claims. (Cl. 17—37)

This invention relates in general to a continuous stuffer for materials under vacuum particularly for food products and specifically described as a feeder for ground meat and meat products into a casing, although it may have a more general use wherever applicable.

In the ordinary feeding of meat products, they are not usually fed under vacuum and if such feeding is attempted, it is usually in batches. The present invention provides for continuous feeding of the material from a hopper under vacuum and the feeding is continuous under vacuum even though the hopper is opened briefly from time to time to add additional material to the hopper.

In filling sausage casings, for example, the elimination of air from the casings by vacuumized feeding not only is a saving in the casings themselves, but also the keeping quality of the food is improved and there is a saving of labor in maintaining a continuous vacuum feeding of the food materials.

An important object of the invention is to provide a method and apparatus for continuously stuffing vacuumized food products.

A further object of the invention is to provide an improved apparatus for maintaining a vacuum which is controlled by automatic setting so that the meat is filled under predetermined and accurate controlled pressure.

A further object of the invention is to provide feeding mechanism which is easily taken apart for sanitary purposes at the end of a run and for thoroughly cleaning all of the parts.

Still a further object is to provide flexible floating plastic means for feeding the material which wears well and makes a tight fitting.

Still a further object of the invention is to eliminate electric wiring and parts by providing air motor drives controlled from an instrument panel for flexibly varying the speed.

A still further object of the invention is to provide automatic air feed control which supplies air to the stuffer drive when the stuffer cock is open and automatically shuts off the air supply when the stuffer cock is closed.

Still a further object of the invention is to provide a vacuum food stuffer which has feeding tubes at the top of the stuffer easily removed for cleaning, slide means at the bottom of the hopper easily accessible for cleaning, fluid pressure control part at the front of the apparatus easily accessible and removable for cleaning and repair.

Other objects of the invention will appear in the specification and will be apparent from the accompanying drawings in which, Fig. 1 is a front view of a continuous vacuumizing stuffer for food products in accordance with the present method, some of the parts being broken away and shown in section;

Fig. 3 is a sectional view taken on the line 3—3 of Fig. 2 showing the feeding mechanism;

Fig. 4 is a sectional view of the feeding mechanism as taken on the line 4—4 of Fig. 3; and Fig. 5 is an enlarged elevation of the control panel showing the instruments on the face, the controlling connections with the instruments at the back thereof and with indications of the various paths of control liquid through said connections and instruments.

Figure 1:
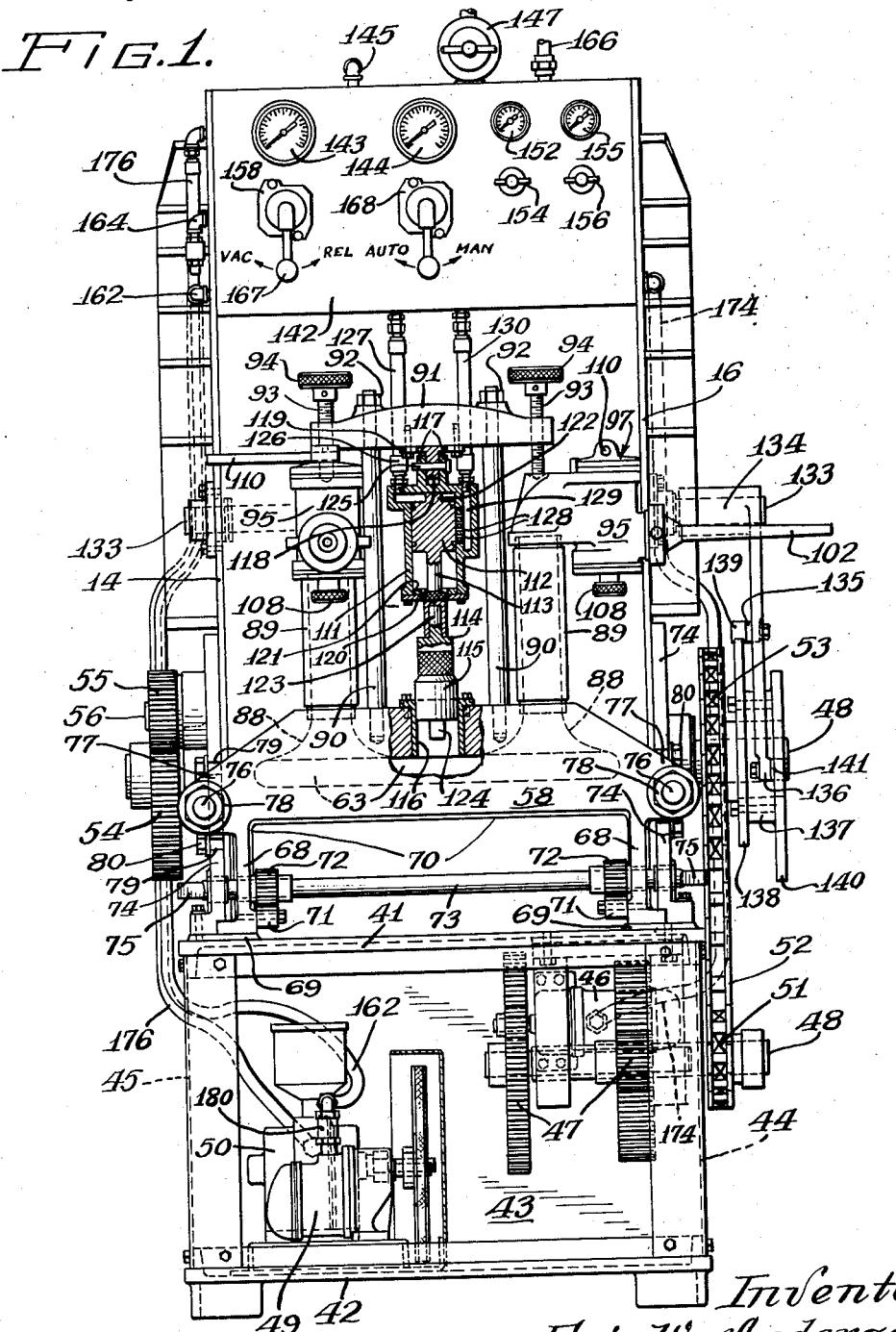

In a continuously operated vacuumizing meat stuffer, it is necessary to replenish the hopper from time to time but this does not materially affect the meat or other material discharged from the bottom of the hopper as it has been subjected to vacuum and the added material is likewise subjected to vacuum as soon as the lid for admitting another batch is closed. No tamping of the material is necessary as it is advanced progressively as long as the feeding parts are in operation. By continuous operation, there is no extra job of cleaning the machine or parts after each batch operation and even at a low speed, the amount of material delivered is much greater than for batch operation.

Referring now more particularly to the drawings, a receiving hopper somewhat oval in cross section comprises a lower plate 10 curved inwardly at the bottom, and an upper plate 12 curved inwardly at the top mounted between side plates 14 and 16 with which a fluid-tight joint is made by soldering, welding or any other suitable means. At the top and joining the upper ends of the upper, lower and side plates at an inclination of about 45° is a hopper lid frame 18 with a pivot 20 connected thereto at the upper edge for hinging a hopper lid 22 thereto for raising and lowering movement to open the hopper for filling it.

Pivotally attached to the lid is an arm 24 having a notch 25 at its outer end for engaging a stud 26 projecting from the lid frame 18 to hold the lid in open position. The lid handle 27 is pivoted on a cross shaft 28 at the central outer portion of the lid and projects downwardly at the side of the hopper where it is more accessible for operation. Projecting at right angles to the handle from the cross shaft at each side of the lid (only one being visible) is a locking arm 29 having an outwardly projecting pin 30 for engaging a lid locking hook 31 projecting outwardly from the hopper lid frame 18.

Also projecting oppositely from the lid handle 27 but inclined at an angle thereto is a lid engaging lug 32, the angle of the under side of the lug to the adjacent surface of the lid being such that when the outer end of the handle 27 is raised, the pin is moved by its locking arm 29 out of engagement with the locking hook 31 before the lug 32 engages the surface of the hopper lid. This assists the opening operation of the lid and when the lid is raised sufficiently, the locking arm 24 is engaged with the stud 26 projecting from the hopper lid frame to hold the lid in raised position.

In the downward movement of the hopper lid, the arm 24 must first be disengaged from the stud 26 and as the lid is lowered with the lug 32 in engagement with the lid, the locking pins 30 (at both sides) are moved into engagement with their locking hooks 31, the pins each riding upon a caming surface 33 in the outer edge of the hook.

When this construction is easily raised and lowered, it is held firmly in open position for charging the hopper and when the lid is closed, it is cammed tightly in place upon the lid frame so that a fluid-tight connection is made at the charging end of the hopper.

At the lower end of the hopper is a feeder roll 34 rotatably mounted upon a cross shaft 35 which projects beyond the side plates 14 and 16 in which it is mounted. At the periphery of the feeder roll are transverse teeth in the form of ribs 36 which are spaced to engage in corresponding grooves 37 of a pressure roll 38 which is also mounted to rotate upon an axis parallel to that of the feeder roll in the side plates. Loosely mounted on the pressure roll and of a thickness to engage between the ribs of the feeder roll and the grooves of the pressure roll is a sleeve 40 which is of flexible, resilient material such as neoprene or the like, adapted to move into and out of the grooves as they are successively engaged by the ribs of the feeder roll and to walk the sleeve around the surface of the pressure roll in accordance therewith.

A hollow supporting base is provided for the hopper which comprises a top plate 41 and a bottom plate 42 spaced therefrom by side plates 43, a front plate 44 and a rear plate 45 all separately bolted or otherwise secured to the top and bottom plates so that all parts of the interior spaces are freely accessible by removal of the corresponding plates. Within this hollow base is an air motor 46 for driving a reduction gearing 47 terminating in a driving shaft 48 which projects from one side of the casing, and a vacuum pump air motor 49 for driving a vacuum pump 50 for exhausting the hopper.

At the end of the driving shaft 48 outside of the hollow base, a driving sprocket 51 is secured which engages with a sprocket chain 52 extending upwardly and passing over and engaging a feed roll sprocket 53 attached at the outer adjacent projecting end of the cross shaft 35 upon which the feeder roll 34 is mounted. At the opposite projecting end of this cross shaft 35 is a driving gear 54 which meshes with a corresponding driving pinion 55 upon a projecting stub shaft 56 at the end of the pressure roll 38 so that it is positively driven in accordance with the movement of the feeder roll.

At both ends of the feeder and pressure rolls within the hopper are end thrust and sealing plates 57 of flexible resilient material such as nylon and the like, to form a fluid-tight connection at the ends of these rolls within the hopper.

At the discharge end of the hopper is a front seal casting 58 which is slidably supported on the top plate 41 and has a curved surface 59 which extends below the feeder roll 34 and upon which is mounted a resilient neoprene or rubber pad 60 extending over the inner end of the casting and held in place at the bottom by a clamping stop plate 61 and held in place at the top by a stop plate 62 so that the lower edge of the hopper lower plate 10 engages the pad above its lower end to make a fluid-tight joint. The surface 59 is curved so that the ribs 36 of the feeder roll engage the upper portion thereof beyond the end of the lower plate 10 and continue engagement with the pad to the upper end thereof.

In the casting 58 at the top of the pad is a pressure meat chamber 63 leading outwardly from the feeder roll 34 and below the pressure roll 38 and its sleeve 40. The adjacent surface of the casting 58 has a curved seat 64 corresponding to the pressure roll 38 and for tightly receiving the pressure sleeve 40 between the roll 38 and the seat so that meat or other food products will be pressed by the rolls 34 and 38 into the pressure chamber 63 as these rolls are rotated in engagement with the front seal casting 58.

At the top of the casting 58 is a grooved seal plate 65 for seating a strip of sealing material 66 such as rubber or neoprene against a triangular brace 67 secured to the outer lower edge of the upper hopper plate 12, the sealing material being preferably disposed at an angle to make a fluid-tight joint with the triangular brace when the front seal casting 58 is pressed inwardly in place.

At the sides of the casting 58 are supporting rails 68 which rest upon side supports 69 providing means for slidably moving the casting into and out of sealing position. Between the rails 68 is an open recess 70 extending below the curved surface 59 of the casting to lighten it and to provide a space for the attachment of a rack 71 at the inner side of each rail 68. Each rack is engaged by a pinion 72 mounted upon a cross shaft 73 which extends through an upright supporting plate 74 at each side of the hopper mounted upon the top plate 41 and additionally secured to each corresponding side plate 14 and 16, together comprising a bottom closure for the hopper and end mountings for the feeder and pressure rolls.

The cross shaft 73 has squared ends 75 at the outer sides of the supporting plates 74 and a crank or wrench may be attached to either squared end for rotating the shaft 73 and with it the pinion 72 for moving the seal plate 58 into and out of sealing position.

To bind the seal plate tightly in position, a locking stud 76 is inserted through each end of the seal casting into an ear 77 projecting laterally from each of the corresponding supporting plates 74 and a nut 78 is threaded on the outer projecting end of the stud for tightly moving the casting 58 inwardly. To remove the casting, these nuts must first be removed from the studs and the casting may also be guided and slidable on the studs. In the adjacent outer edges of each supporting plate 74 are notches 79 above and below the ear 77 for receiving bolts 80 therein, the heads projecting at the outer side of the corresponding supporting plate so that when the seal casting 58 is inserted in place, the bolts 80 may be tightened against the corresponding supporting plate 74 at each end of the seal casting to hold the sides of the hopper at this end and the end thrust sealing plates 57 tightly in engagement with the ends of the feeder roll 34 and the pressure roll 38.

This engagement is not so tight as to obstruct rotation of the feeder roll 34 and the pressure roll 38, but it is sufficiently tight to make a fluid-tight joint between the suction within the hopper and the feeding pressure at the outer side of these discharging rolls.

In the sides of each supporting rail 68 is a slot 81 through which the cross shaft 73 extends freely so that when this cross shaft is rotated, to operatively engage the pinion 72 with the rack 71, the seal casting 58 will be moved outwardly upon the top plate 41 but will not be disengaged therefrom and may be returned by rotating the cross shaft 73 in the reverse direction.

One of the principal objects in making the front seal casting 58 displaceable is to make the lower discharging rolls 34 and 38 freely accessible for cleaning and for repair or replacement of the parts. Another feature of the cleaning of the pressure roll is to provide a central inlet passage 82 at one end of the stub shaft 56 by which the pressure roll is mounted in the side plate 43 with a hose connection 83 at the outer end of a passage. At the inner end of a passage 82 which is near the adjacent end of the grooves 37 are radial passages 84 extending from the inlet passage to the inner portions of the grooves 37. At the other end of the pressure roll 38 is a similar central discharge passage 85 with radial connections 86 from the bottoms of the grooves 37 of the pressure roll to the inner end of the discharge passage. At the outer end of the discharge passage is a pipe nipple 87 for a hose or other connection so that hot or cleaning water, steam and the like, may be blown through the grooves 37 between the pressure roll and the sleeve 40 thereof, thereby providing means for cleaning and sterilizing the roll and sleeve without actually dismantling these parts for thoroughly cleaning them.

At the top of the seal casting 58 are two discharge passages 88 communicating with the pressure meat chamber 63, each opening through the top of the casting and having one end of a stuffer cock connection tube 89 inserted in the opening and forming the continuation thereof. Between these tubes are supporting rods 90 threaded into the casting 58 at their lower end and extending through a yoke 91 at their upper ends, the yoke resting upon a reduced shoulder and nuts 92 threaded on the ends of the rods against the top of the yoke for holding it tightly in place. The ends of the yoke extend beyond the rods and have threaded openings located centrally with respect to the connection tubes 89 and each having a stuffer cock clamping screw threaded therethrough with a knob 94 at the top of the screw for adjusting it in the yoke.

Disposed between the upper end of each connection tube 89 and the lower end of the clamping screw 93 is a stuffer cock body 95 having an opening for seating it at the upper end of its tube 89 and an opening on top for engagement of the end of the clamping screw 93. By threading the clamping screw 93 downwardly upon the body, it is clamped tightly in place but may be adjusted so that the cock extends forwardly as the left cock in Fig. 1 or at right angles thereto as the right cock in this figure.

Within the stuffer cock body is a passage 96 leading from the top of the tube 89 outwardly at an angle thereto into a stuffer cock valve 97. This valve may be of any suitable construction such as shown for example in Fig. 2 in which a sleeve 98 is mounted within the valve body having an upper opening 99 to register with the discharge end of the passage 96 and having a lower opening 100 to register with a discharge nozzle 101 to which a projecting tapered stuffing tube 102 is connected by a threaded locking ring 103.

Within the sleeve 98 from the top thereof is a rotatable valve body 104 having an upper opening 105 to register with the upper opening 99 of the sleeve 98 and a lower opening 106 to register with the lower opening 100 of the sleeve. The valve body 104 is retained in the sleeve by a locking plate 107 at the bottom which overlaps the ends of the sleeves and is secured in position by a fastening screw 108 inserted through the plate 107 into the bottom of the valve body 104. At the top of the valve, this valve body 104 also overlaps the ends of the sleeve 98 and is formed with an upwardly projecting ear 109 through which an operating handle 110 is inserted for rotating the valve body to any desired position either to shut off the valve, or to open it partially or entirely, to discharge material through the stuffing tube 102.

These stuffing tube parts are made and assembled in this manner so that they can be quickly taken apart and put together simply by disengaging the clamping screws 93 which loosen the stuffing cocks as well as the connection tubes 89 so that all of these parts can be carefully washed and cleaned free from any adhering food parts to make them as sterile and sanitary as possible. It will also be noted that the stuffer cock parts may be disengaged from the seal casting 58 without removing the casting from its locked position at the bottom of the hopper. The casting 58 may also be bodily removed from the bottom of the hopper without disengaging the stuffer cock parts as above described.

Also supported by and between the seal casting 58, the yoke 91 and between the supporting rods 90 as shown more clearly in Fig. 1 is the automatic air flow pressure control which comprises an air cylinder 111 with a piston 112 movable therein and connected by its piston rod 113 with a stem 114 of a plunger 115 movable in an open ended cylinder 116 mounted in the upper edge of the seal casting 58 and communicating with the pressure chamber 63 in the seal casting. At the top of the cylinder 111 are perforated ears 117 spaced apart between which extends a perforated projection 118 of a cylinder supporting plate 119 which is suitably attached by bolts or otherwise to the under side of the yoke 91. This allows the cylinder 111 to swing back and forth upon a pivot 125 inserted through the ears 117 and the perforated projection 118 when it is disconnected from the plunger 115.

At the bottom of the air cylinder 111 is a removable plate 120 through which the piston rod 113 extends freely with a pad 121 at the inside of the plate to engage and cushion the piston in its downward movement. At the upper end of the piston 112 is a projection 122 which engages the top of the cylinder and prevents the piston from entirely closing the end of the piston. The outer extremity of the piston rod 113 is formed with a recess for receiving a reduced end 123 of the stem 114 of the plunger 115, when its plunger 115 is in a raised position in its cylinder 116, but allowing a disconnection of the piston and the plunger when the piston is at the top of its cylinder and the plunger is at the bottom of its cylinder. To limit the downward movement of the plunger 115, it is also provided with a projection 124 which limits its downward movement in the pressure chamber 63. The connection between the piston 112 and the plunger 115 is therefore a telescoping connection which may be disconnected by moving them oppositely so that these two parts can be taken apart and the plunger lifted out of its cylinder when the air cylinder 111 is swung forwardly or rearwardly upon its pivot 125 which extends through the ears 117 and the perforated projection 118 as previously described.

To assemble the piston and plunger, the operation just described is reversed, that is, the plunger is inserted in its cylinder 116, the cylinder 111 is swung in alignment with the stem 114 of the plunger and the stem and piston rod 113 are telescoped together for joint operation.

At the top of the air cylinder 111 is an air pipe connection 126 for an air pressure inlet pipe 127 which is prevented from being closed off by the piston 112 in the air cylinder by the projection 122 at the upper end of the piston. At the side of the cylinder opposite the air inlet 127 are a number of perforations 128 extending lengthwise of the piston into a discharge passage 129 formed in this wall of the cylinder and having an air pipe connector 130 leading from the top of this passage 129. The automatic operation of this construction is that air under pressure is admitted through air pipe 127 which tends to press a piston 112 downwardly thereby uncovering more of the perforations 128 as it is moved downwardly and thereby increasing the air pressure and volume in the discharge passage 129. This downward movement of the piston is opposed by the plunger 115 which receives pressure tending to force it out of its cylinder from the pressure chamber 63. When the pressure in the chamber 63 increases, it tends to force the plunger upwardly and outwardly, thereby tending to close more of the perforations 128 covered by the piston 112. This may be adjusted by air pressure controlling means as hereafter described.

In operating this vacuumized stuffer, it is desirable to feed the meat or other food-stuff at the bottom of the hopper and into the path of the feeder roll 34. This is effectively accomplished by means of a curved feeder plate 131 which conforms to the curvature of the lower end of the lower hopper plate 10 and the plate is supported from its upper end by arms 132, one at each side of the plate, the arms being keyed to a shaft 133 which extends across the hopper above feeder roll 34 and projects through the side plates 14 and 16 of the hopper where a fluid tight seal is provided. One end of the shaft 133 as shown in Fig. 1 projects beyond the hopper side plate at the same end of the driving shaft 48 which is connected to the feeder roll 34. Keyed to the shaft 133 outside of the hopper is a hub 134 having a fixed or integral arm with two projections 135 relatively shorter than the projection 136. Secured to the shaft 48 is a hub member 137 having two cams 138 corresponding to the projection 135 which has a contact member 139 and another cam 140 for the longer projection 136 which is engaged by a contact member 141.

Figure 2:
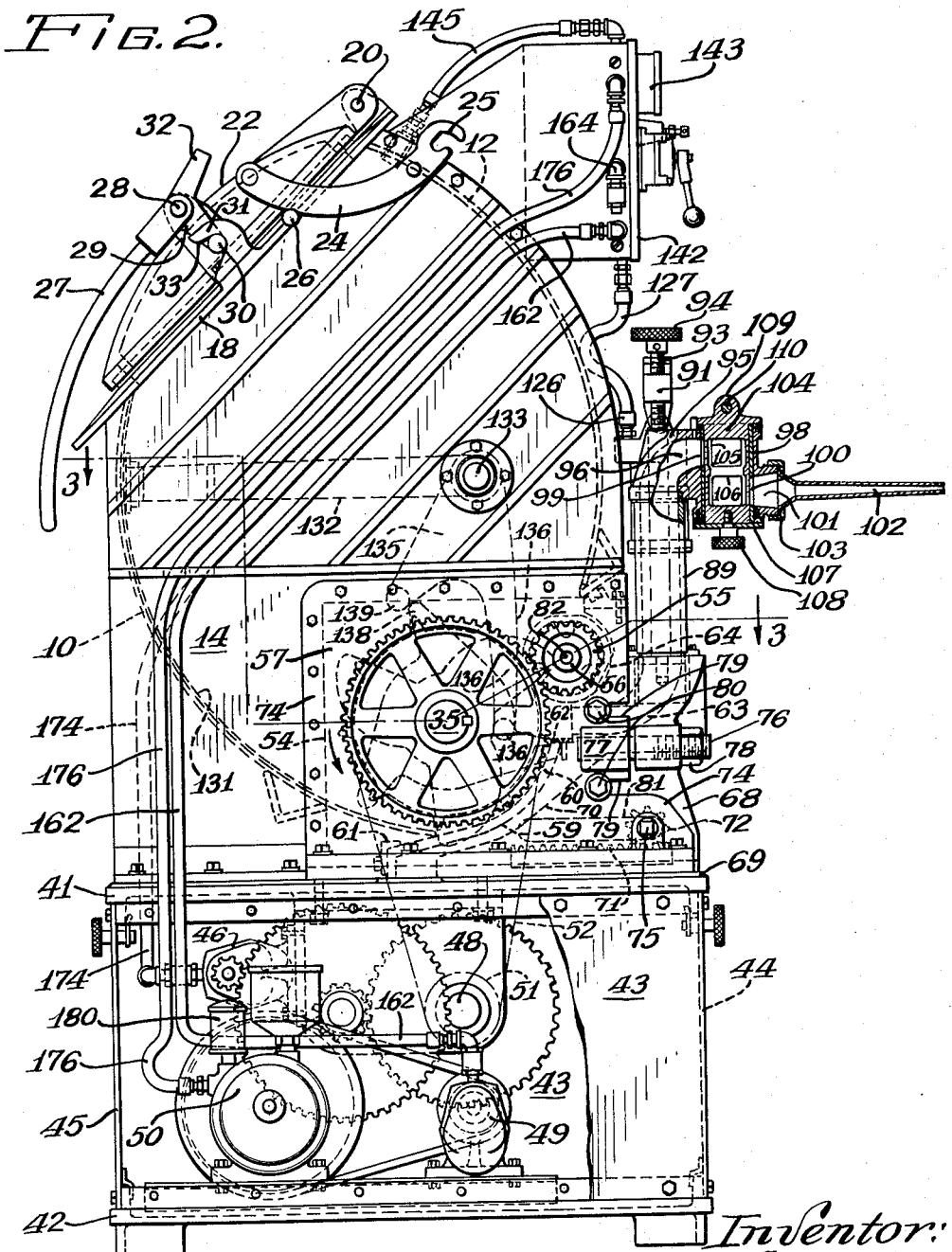
Fig. 2 is a side elevation of the stuffer shown in Fig. 1 with some of the parts broken away and shown in section.

The cam lobes on the cam member 140 shown in outline in Fig. 2 have a relatively gradual surface for moving the shaft 133 gradually in a counterclockwise direction advancing the feeder plate 131 as the shaft 48 is rotated in a counterclockwise direction with an abrupt stop when the plate reaches the end of its stroke under the feeder roll 34 and at that time, the contact 139 of the shorter projection 135 is engaged by one lobe of its cam 138 which quickly returns the plate 131 to its upper position by rotating the shaft 133 in a clockwise direction. As shown in Fig. 2, one lobe of the cam 138 is just at the point of releasing the contact 139 which then allows the other projection 136 of the plate operating arm to be picked up by the next lobe of its cam 140 for more slowly moving the feeder plate 131 downwardly toward the feeder roll, and thus continuing the rod feeding movement in the hopper with a relatively slow advancing and quick returning movement of the plate.

At the upper front side of the stuffer is a control panel 142 with a number of instruments mounted therein for visibly connecting air pressures and for controlling the operation of the parts. Although the fluid connections are generally referred to as pipes, it should be understood that these may also be flexible hose, plastic tube or other connections so that for conveying air under pressure to and from the various instruments and other operated parts. The various nipples, elbows and other fittings are not described in detail unless there is some novel feature in connection therewith.

At the upper portion of the panel is a gage 143 for indicating vacuum and a gage 144 for indicating operating pressure. The vacuum gage is connected at the top of the panel through a pipe connection 145 with the inside of the top of the hopper and indicates generally the vacuum as applied thereto. The pressure gage 144 is connected to an air pressure inlet pipe line 146 in which are an air pressure reducer valve 147, a connection T 148, an air line lubricator 149, an air filter and moisture separator 150, and an air pressure pipe line control valve 151.

A pressure gage 152 is also mounted in the control panel for indicating the pressure to the vacuum motor 49 and it has an air pressure reducer valve 153 at the back of the panel controlled by a handle 154 projecting at the front of the panel. Likewise, a gage 155 is mounted in the panel for controlling the pressure to the air stuffer motor 46 for driving the feeder roll and it has an air reduction valve 156 mounted at the back of the panel and controlled by a handle 157 at the front of the panel.

The vacuumized stuffer is controlled by two four-way air control valves on which one port of each valve is permanently closed. A four-way valve 158 is mounted directly below the vacuum gage 143 at the rear of the panel and has four ports of which one is permanently closed. One port is connected with a pipe 159 which leads to the pipe 145 for exhausting the hopper. Another port is connected by means of a pipe connection 160 to one side of a check valve 161 and thence to a pipe line 162 leading to the vacuum pump air motor 49. The check valve is connected at its other side by a pipe connection 163 with a discharge fitting 164 at the left side of the panel to provide an air intake through the check valve when the vacuum is released, the check valve opening in the direction of the arrow as shown in Fig. 5. The third open port of the valve 158 is connected by a pipe line 165 which extends through the vacuum motor reducer valve 153 and thence through a pipe line 166 to the connection T 148 in the inlet pipe line.

At the front of the panel board is an operating handle 167 for the vacuum control valve 158 which is removable from a central neutral position to a position at the left thereof for connecting the vacuum pump for operation and to a position at the right for vacuum release as hereafter set forth in more detail.

Below the stuffer motor gage 155 is another four-way valve 168 with one port permanently closed and with one port connected by a pipe line 169 which also connects with the air pressure line 126 for the air pressure control which extends to the air motor 46 for driving the feeder rolls. Another port of the valve is connected by a pipe 170 to the air pressure inlet pipe line 146. The third port of the valve 168 is connected by a pipe line 171 to one side of the reducer valve 156 for the stuffer motor gage 155 and the other side of the gage is connected by a pipe line 172 to a T 173. The T is connected at one end by a pipe 174 leading directly to the air stuffer motor 46 for manual operation and the opposite end of the T is connected through a check valve 175 and thence to the pipe connection 130 which extends from the discharge passage 129 of the air pressure control.

An air suction line 176 extends from the upper left side of the panel to the vacuum pump 50 at the bottom thereof and this line is connected by a pipe 177 to the pipe 159 leading to the pipe connection 145 which extends to the hopper, and a pipe 178 also extends from the air suction line to the vacuum gage 143 for indicating the vacuum. These air pressure pipe line connections 127 and 130 may each be formed with a loop and may be flexible if desired to allow the front seal casting 58 to be moved forwardly for uncovering the discharge feeder and pressure rolls without manually disconnecting the hose connections.

At the front of the panel board is an operating handle 179 for the pressure motor control valve 168 which is movable from a central neutral position to a position at the left thereof for connecting the pressure motor for automatic operation, and to a position at the right for manual operation of the motor 46 when the feeder roll 34 and the pressure roll 38 are to be driven without feeding food material from the hopper and mainly for cleansing purposes.

As thus described, the parts are all connected in proper relation for the operation of the stuffer. The operating handles 167 and 179 are in their central neutral position.

If the stuffer is to be operated automatically, the stuffer control operating manual 179 is turned from its central to the left position for automatic operation. This will let air as indicated by the broken arrow path from the inlet pipe 146 pass through the air pressure reducer valve 147 and pipe 170 and through four-way valve 168 and pipe line 169 through air pipe connection 126 into the top of the air cylinder 111. This causes the air flow control top piston 112 to move downwardly allowing air to escape through the perforations 128 extending lengthwise of the cylinder into the passage 129 and thence through pipe connection 130 back to the control panel and through check valve 175 and outwardly through pipe connection 174 to the air motor 46.

As soon as this air under pressure reaches the intake side of the air motor, it starts in operation and through the reduction gear 47, power is transmitted through the sprocket chain 52 to the feeder roll sprocket 53 which thereby operates the feeder roll 34 and the pressure roll 38.

At this time, the vacuum pump 50 may be driven by its air motor 49. If the vacuum control operating handle 167 is turned from a neutral position to the left vacuum pump position, air from the supply line 146 (indicated by the broken arrows) enters the vacuum four-way valve 158 by first passing through air pipe line 166 from the T 148 and through pressure reducer valve 153 and pipe line 165. The air emerges from valve 158 through pipe 160 and one end of the check valve 161 and thence through pipe line 162 connected to the vacuum pump driving motor 49. This motor is directly connected to the vacuum pump 50 and the pump is connected to the interior of the hopper by the air suction line 176 and through pipe 177 to the pipe connection 145 leading directly to the top of the hopper, and by pipe 178 to the vacuum gage 143. The air inlet end of the vacuum pump is provided with a check valve 180 as shown in Fig. 2 near the bottom of pipe line 176 to prevent air from returning to the meat hopper when the vacuum pump has been stopped.

In releasing vacuum in the hopper, the control handle 167 is turned past the neutral point to the vacuum release position which closes the valve port for the pressure supply pipe line 165 but opens the ports between pipes 159 and 160. Air will then enter, as indicated by full line arrows, through the fitting 164 at the end of pipe connection 163 connected to the check valve 161 allowing air to pass through pipe 160 within the valve 158 and through pipes 159 and 145 to the interior of the hopper.

As the feeder roll 34 starts to rotate, meat or any other food product in the hopper is picked up by the ribs 36 on the feeder roll and forced into the pressure meat chamber 63. The sealing or pressure roll 38 prevents the meat from rotating back into the hopper with the feed roll and instead causes it to build up pressure in the meat chamber which, unless one of the stuffer cock valves 97 is opened, will exceed the air pressure on top of the air control piston 112. This will cause the piston to rise, thus gradually shutting off air circulation from the air cylinder 111 through the perforations 128 and the air pipe connection 130 to the air motor and causing it to stop.

Thus the stuffer feeder roll 34 will remain in a standstill position until a stuffer cock valve is opened and pressure in the meat chamber 63 is released, at which time the piston 112 is forced down by the predominating air pressure at the top of the air cylinder 111 which again opens communication through the perforation 128 and the discharge passage 129 leading to the air pipe connection 130 to the air motor 46. Thus this operation is called automatic since the whole sequence of operating the stuffer is controlled by the stuffer cocks alone, and the maximum pressure on the meat in the pressure meat chamber is indicated by the gage 144 which is connected to the incoming pressure pipe 170 which in turn is connected to the air pressure inlet pipe 146.

As the feeder roll 34 is operated, the feeder plate 131 near the bottom of the hopper is accordingly operated, by the engagement of the cams 138 and 140 with their corresponding projections 135 and 136 which causes the operating arms 132 to move downwardly with the feeder plate 131. When the top of one segment of cam 140 has reached the end of its projection 135, the feeder plate is as far down as it will travel, and immediately one of the segments of the other cam 135 will engage the cam follower at the end of the shorter projection 136 which will force the operating arms 132 and the feeder plate back to the top position.

Due to the construction of the segments on the cams 138 and 140 and the location of the cam follower rolls on the ends of the projections 135 and 136, the feeder plate will move downward with only about one-third of the speed at which it returns. One reason for this is to have the forward speed of the feeder plate substantially synchronized with the peripheral speed of the ribs of the feeder roll 34 when it is rotating.

One of the main purposes of automatic operation is that since all air motors have a very low efficiency, it is of the utmost importance that as much as possible of all available air should be saved. By having an arrangement with an intermediate air control cylinder 111 as shown in this construction, there is never any idling of the stuffer air motor 46. The stuffer is operated in the same manner as the conventional old style stuffers; air is used only when one or both stuffer cocks are open, and the air pressure can be regulated to suit any texture or condition, as well as any temperature of the meat or other material which is being fed. With the automatic control, no other manipulations of valves or controls are required outside of the stuffer cock handles.

When manual operation of the stuffer is desired, the stuffer control handle 179 is turned to the right marked (Manual) from the central position which will cause air to pass directly to the stuffer air motor 46 as indicated by the broken arrow path by-passing the flow control cylinder 111 and its connected parts. In the manual operation, the air reducer valve 147 is opened to the maximum pressure or the air supply line pressure. The pressure to the motor 46 is controlled instead by pressure reducing valve 156 of which the pressure is indicated by the gage 155. The path of the air flow at this time to the motor is as follows: It enters the four-way control valve 168 through the pipe 170 as in automatic operation, but emerges from the valve through pipe 171 and thence through reducing valve 156 and by means of pipe 172 to the pipe 174 for operating the motor 46. Thus the automatic air control cylinder and its connections and the check valve 175 are by-passed and the check valve 175 prevents air from flowing into the air control cylinder 111 when the stuffer is operated manually.

The purpose of manual control is to be able to run the stuffer with a pressure on the meat or other products in excess of the conventional air pressure which may be about 125 lbs. in the average packing house. In the case of stuffing or running frozen meat or food through the stuffer, a pressure of 150–200 lbs. (p.s.i.) might be required and this may be obtained by regulating the air pressure valve 156 to the desired pressure as the torque of the feeder roll is far in excess of the resistance that the meat will develop at 125 lb. pressure, as is used when the machine is operated automatically.

When the front seal casting has been opened up for cleaning, the feeder and pressure rolls may be run manually without danger of causing the extruding end of the top piston 112 to jam accidentally against any other part of the machine. In cleaning the machine, the lower piston or plunger 115 is removed from its cylinder 116 by forcing down the top piston 112 by turning the handle 179 of the control valve to the left and then back to neutral. The top piston is now lifted until the recessed end of its piston rod 113 disengages the stem 114 on top of the plunger 115 whereupon the whole cylinder assembly is swung toward the meat hopper thus leaving the plunger free to be removed from its cylinder 116. This rearward swinging movement is permitted by making the air pipes 127 and 130 with a partial loop of flexible material so that they can be deflected intermediate their end with connections disengaging them.

In filling the hopper, the meat should be spread out evenly, but no tamping is required. If the meat is to be vacuumized, the lid should be closed and the vacuum pump operated until the desired vacuum has been obtained before turning the stuffer operating handle to automatic operation. Manual operation of the stuffer is used only when the machine has been taken apart for cleaning and idling of the feed and pressure rollers and may speed up the job. The air motors may be operated under air pressures from 50–125 lbs. per square inch, but 90 lbs. per square inch is recommended.

In cleaning the machine, the front seal casting 58 is loosened and moved forward to its stop position; the stuffer cocks with their connection tubes are removed and the control piston between the stuffer cocks should be lifted up and tilted out of the way; all loose meat is removed from the inside of the hopper and the seal casting, and steam and water hose is connected to one end of the pressure roll and as the feeder and pressure rollers are rotated idly, steam and water under some pressure (such as 30–40 lbs.) should be applied until the water emerges perfectly clear at the outlet end of the pressure roll. While idling the machine, clean the inside of the hopper and lid as well as the outside of the pressure roll with steam and water, take care that the hose is not caught between the feed and pressure rolls. After the machine has been cleaned, all surplus water should be moved from the surfaces either by air or dry cloths. In closing the machine after cleaning it, the front locking nuts for the seal casting should not be drawn up too tight as too much pressure will cause a break load on the feeder and pressure rollers. The rollers should not be operated with the machine in closed position unless there is meat or water in the hopper.

In continuous and automatic operation, meat or other material to be stuffed is fed in batches in the hopper by opening the hopper lid and tightly closing it without delay after each filling operation. During such batch filling, the vacuum on the hopper is relieved whenever the lid is open but the lowermost meat in the hopper has been subjected to vacuum, and as soon as the lid is closed, the continuous operation of the vacuum pump will again increase the vacuum in the hopper, so that while the vacuum may not be continuous on all the meat in the hopper, it will all be subjected to the vacuum and the material at the lower end of the hopper which is discharged by the feeder roll, will all have been subjected to the vacuum when it is discharged in the hopper.

Subsequent feeding of the meat or other material under pressure from the hopper by the rolls 34 and 38 causes it to be placed under considerable pressure in feeding it from the stuffing cocks. Thus the material is fed in batches, placed under suction, intermittently fed to pressure feeding means which discharges the material into a meat casing or any other desired receiver.

Thus the stuffer may be operated continuously, placing the material treated under vacuum and pressure, thereby accordingly reducing air voids and producing a product which is compactly filled in casings, and resulting in more weight of material per given length of casing. In placing the hopper under vacuum, it is found that a three-quarter horse-power vacuum pump connected to a 500 lb. meat containing hopper is usually operated from 1½ to 2 minutes for obtaining a 28" vacuum. This indicates how rapidly the vacuum is applied so that even though the material is fed into the hopper in batches, it is all quite thoroughly subjected to the vacuumizing process by the time the material reaches the feeder roll at the bottom of the hopper.

The stuffer construction is particularly designed for ease in cleaning and servicing all of the parts, the front seal casting being slidable to open the bottom of the hopper for inside cleaning if desired, the feeder roll 34 and the pressure roll 38 being mounted upon supporting plates 74 at the sides of the hopper which may be removed from the hopper side plates 14 and 16 if desired. Even the pressure roll is provided with passages for cleaning it and its sleeve 40 by steam or water without removing the sleeve from the roll.

While the method and apparatus for a continuous vacuumizing stuffer has been described in some detail, it should be regarded by way of illustration and example rather than a restriction or limitation thereof, as many changes in the construction, combination and arrangement of the parts may be made without departing from the spirit and scope of the invention.

I claim:

1. In a vacuum material stuffing apparatus, the combination with a hopper, means to seal the upper end of the hopper and a vacuum pump connected to the upper portion of the hopper, a feeder roll rotatable at the bottom of the hopper having ribs projecting therefrom, a discharge passageway at the bottom of the hopper adjacent the periphery of the feeder roll and a sealing roll having grooves therein to receive the ribs of the feeder roll and rotatable therewith, the feeder roll and the sealing roll together closing the entrance to the passageway providing for the discharge of the material from the hopper and flexible sealing means between the feeder roll and the sealing roll.

2. In an apparatus according to claim 1, the sealing roll having a flexible sealing sleeve loosely mounted thereon and extending between the projections of the feeder roll and the grooves of the sealing roll and making a fluid-tight joint at the bottom of the hopper.

3. In a stuffer apparatus in accordance with claim 1, a plastic resilient material secured to a circular portion the bottom of the hopper in the path of and engaged by the ribs of the feeder roll adjacent one side of the discharge passageway for making a fluid-tight joint between the feeder roll and the hopper for feeding material into the discharge passageway.

4. In a stuffer in accordance with claim 1, the bottom of the hopper having plastic material at one side of the passageway engaged by the outer edges of the ribs as they approach the passageway for feeding material thereto and the sealing roll having a resilient sleeve mounted loosely thereon to engage between the ribs of the feeder roll and the grooves of the sealing roll walking the sleeve around the sealing roll and the sleeve engaging the hopper wall at the opposite side of the passageway for discharging material from the feeder roll into the passageway.

5. In a stuffer apparatus in accordance with claim 1, a feeder plate and a circular portion at the bottom of the hopper engaged thereby, and means mounting the plate therein to move toward and from the periphery of the feeder roll ribs to advance material thereto.

6. In a stuffer in accordance with claim 5, means for continuously rotating the feeder roll and the sealing roll, and means actuated in conjunction with the movement of the feeder roll for intermittently advancing and more quickly retracting the feeder plate to supply material in the hopper relative to the feeder roll.

7. In a vacuum stuffing machine, the combination with a hopper having a fluid tight filling lid at the top and a closure comprising side plates at the bottom, of vacuum pump means connected to the upper portion of the hopper, means mounting the side plates for sealing movement toward and from the hopper and to expose the closure and the bottom of the hopper for cleaning, the closure having a discharge passage, means sealing the closure with the sides of the hopper including a flexible pad at the lower side of the discharge passage and with means forming a circular recess at the top of the discharge passage, a feeder roll mounted to rotate at the bottom of the hopper having ribs to engage the said flexible pad near the opening of the passage, a sealing roll having grooves corresponding to the ribs of the feeder roll, a resilient sealing sleeve mounted on the sealing roll and engaging between the ribs and grooves successively as the feeder roll and sealing roll are rotated, the sleeve fitting loosely on the sealing roll to walk around it and making contact with the circular recess at the side of the passage for confining material from the hopper into the discharge passage as the feeder roll and the sealing roll are rotated.

8. In a stuffer in accordance with claim 7, the closure having means for tightly connecting it at the bottom of the hopper to make a fluid-tight joint, and means for bodily moving the closure free from engagement with the bottom of the hopper when the said tightly connecting means are disengaged.

9. In a continuous vacuum stuffer in accordance with claim 7 in which the vacuum pump means connected to the hopper comprises a continuously operating fluid motor, an air exhauster operated thereby, and means for automatically controlling the speed of the motor depending upon the pressure within the hopper.

10. In a vacuum stuffer in accordance with claim 9, in which the means for automatically controlling the speed of the motor comprises a cylinder with a piston movable therein having a plurality of discharge openings covered and uncovered by the piston as it moves in the cylinder, the movement of this piston being opposed by pressure within the hopper, said openings being in a fluid supply line to the motor for operating the fluid-tight feed rolls and the piston operating automatically to cover additional holes as the pressure increases within the hopper and thereby controlling the speed of the motor for the feeder rolls.

11. In a continuous vacuum stuffer in accordance with claim 10, stuffer cock means in connection with the discharge from the fluid-tight feeder rolls for thereby relieving the pressure within the hopper, allowing the control piston to cover more of said openings and to admit a greater volume of air under pressure to the motor for driving the fluid-tight feed rolls and thereby causing it to discharge material from the hopper through the stuffer cock means.

12. In a continuous vacuum stuffer in accordance with claim 11, valve means for controlling the flow of fluid pressure to the motor for applying vacuum, and valve means for admitting fluid under pressure to pass through the automatic fuel control means for operating the fluid motor for driving the fluid-tight feed rolls.

13. In a vacuum stuffer in accordance with claim 12, means forming an alternate path for the flow of fluid pressure to the motor also controlled by the valve means for the fluid motor for driving the fluid-tight feed rolls for by-passing the means for automatically controlling the motor for driving the fluid by feed rolls and thereby manually controlling the said motor in accordance with the pressure admitted through said valve means.

References Cited in the file of this patent

UNITED STATES PATENTS

| | | |
|---|---|---|
| 765,899 | Louden | July 26, 1904 |
| 1,368,869 | Whiting | Feb. 15, 1921 |
| 1,469,377 | Brightbill | Oct. 2, 1923 |
| 2,023,608 | Nebel | Dec. 10, 1935 |
| 2,427,202 | Dyrek et al. | Sept. 9, 1947 |
| 2,690,589 | Moses | Oct. 5, 1954 |
| 2,690,970 | Moses | Oct. 5, 1954 |
| 2,697,402 | Lindquist | Dec. 21, 1954 |
| 2,776,086 | Selden | Jan. 1, 1957 |

FOREIGN PATENTS

| | | |
|---|---|---|
| 445,393 | Italy | Feb. 14, 1949 |
| 1,086,713 | France | Aug. 11, 1954 |